United States Patent
Tian et al.

(10) Patent No.: US 8,935,535 B2
(45) Date of Patent: Jan. 13, 2015

(54) SECURE REGISTRATION-FREE FINGERPRINT AUTHENTICATION METHOD AND SYSTEM BASED ON LOCAL FEATURES

(75) Inventors: Jie Tian, Beijing (CN); Xin Yang, Beijing (CN); Peng Li, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 138 days.

(21) Appl. No.: 13/807,077

(22) PCT Filed: May 12, 2011

(86) PCT No.: PCT/CN2011/073981
§ 371 (c)(1),
(2), (4) Date: Mar. 21, 2013

(87) PCT Pub. No.: WO2012/151753
PCT Pub. Date: Nov. 15, 2012

(65) Prior Publication Data
US 2013/0173927 A1    Jul. 4, 2013

(51) Int. Cl.
*G06F 21/32*    (2013.01)
*G06K 9/00*    (2006.01)

(52) U.S. Cl.
CPC ............ *G06F 21/32* (2013.01); *G06K 9/00093* (2013.01); *G06K 2009/00953* (2013.01)
USPC ...................................................... 713/186

(58) Field of Classification Search
CPC ................... G06F 21/32; G06K 2009/00953; G06K 9/00093; G07C 9/00087; G07C 9/00158; H04L 9/32; G06Q 20/40145
USPC ........................................................ 713/186
See application file for complete search history.

(56) References Cited

U.S. PATENT DOCUMENTS

| 6,634,009 | B1 * | 10/2003 | Molson et al. ................ 716/100 |
| 7,376,826 | B2 * | 5/2008 | Tardo et al. .................. 713/151 |
| 7,451,292 | B2 * | 11/2008 | Routt .............................. 712/14 |
| 7,779,268 | B2 * | 8/2010 | Draper et al. ................ 713/186 |
| 8,225,090 | B2 * | 7/2012 | You et al. ..................... 713/161 |

(Continued)

FOREIGN PATENT DOCUMENTS

CN          101777115 A     7/2010

OTHER PUBLICATIONS

International Search Report (with English translation) for PCT Application No. PCT/CN2011/073981, dated Aug. 18, 2011, 4 pages.

(Continued)

*Primary Examiner* — Farid Homayounmehr
*Assistant Examiner* — Sanchit Sarker
(74) *Attorney, Agent, or Firm* — Westman, Champlin & Koehler, P.A.

(57) ABSTRACT

A secure registration-free fingerprint authentication method based on local structures comprising: extracting descriptor features and local structure features of fingerprint minutiae from an input fingerprint image; conducting quantization and feature selection with respect to the features of the fingerprint minutiae; and encrypting the selected features and then decrypting the encrypted features to obtain the fingerprint image. The method adopts local features for fingerprint authentication, thus avoiding the complex registration in encryption domain. The method lowers the risk of the fingerprint authentication being attacked and improves security.

16 Claims, 3 Drawing Sheets

(56) References Cited

U.S. PATENT DOCUMENTS

| | | | |
|---|---|---|---|
| 8,375,218 B2* | 2/2013 | Yedidia et al. | 713/186 |
| 8,510,608 B2* | 8/2013 | Futa et al. | 714/52 |
| 2003/0035389 A1* | 2/2003 | Chen et al. | 370/331 |
| 2007/0128899 A1* | 6/2007 | Mayer | 439/152 |
| 2009/0040081 A1* | 2/2009 | Yang et al. | 341/94 |
| 2010/0120433 A1* | 5/2010 | Grilli et al. | 455/436 |
| 2012/0173936 A1* | 7/2012 | Johnson et al. | 714/718 |
| 2013/0064434 A1* | 3/2013 | Riopka et al. | 382/125 |

OTHER PUBLICATIONS

Written Opinion for International Search Report for PCT Application No. PCT/CN2011/073981, dated Aug. 18, 2011, 4 pages.

Chikkerur et al., "Generating Registration-free Cancelable Fingerprint Templates", Biometrics: Applications and Systems, 2008, Oct. 2008, pp. 1-6, Fig. 2, 6 total pages.

Y. Dodis et al., "Fuzzy Extractors: How to Generate Strong Keys from Biometrics and Other Noisy Data", EUROCRYPT 2004, Lecture Notes in Computer Science 3027, 2004, 18 pages.

A. Juels and M. Wattenberg, "A fuzzy commitment scheme", Proceedings of the 6th ACM conference on Computer and communications security, Kent Ridge Digital Labs, Singapore, Nov. 1-4, 1999, p. 28-36.

J. D. Golic and M. Baltatu, "Entropy Analysis and New Constructions of Biometric Key Generation Systems", IEEE Trans. Information Theory, vol. 54, No. 5, May 2008, pp. 2026-2040.

* cited by examiner

SECURE REGISTRATION-FREE FINGERPRINT AUTHENTICATION METHOD AND SYSTEM BASED ON LOCAL FEATURES

CROSS-REFERENCE TO RELATED APPLICATION

This Application is a Section 371 National Stage Application of International Application No. PCT/CN2011/073981, filed May 12, 2011, the contents of which are hereby incorporated by reference in their entirety.

BACKGROUND OF THE INVENTION

The present invention relates to a fingerprint authentication system, especially a secure registration-free fingerprint authentication method and system based on local features.

With the increasingly popular application of biometrics in real life, more attention has been drawn to security and privacy problems caused thereby. Investigations show that publics' concern about the risk of identity information leakage and thus potential risk of information security have prevented extensive acceptance of the biometrics, especially fingerprint authentication. Theoretically, any biometric system may face a possibility of being attacked. The security of biometric templates is a key factor for preventing such attacks. Therefore, a secure fingerprint authentication system, in which the templates are securely protected from being obtained easily by attackers, is attracting increasing attention.

Fuzzy commitment scheme is a kind of biometric encryption technology capable of protecting both biometric information and user keys. This scheme can protect the biometric templates from being stolen as well as provide a convenient way for key storage. This scheme was proposed by Juels et al. in 1999 (Ari Juels and Martin Wattenberg. A fuzzy commitment scheme. In Proc. 6$^{th}$ ACM Conf. Comput. Commun. Secur., pages 28-36. ACM Press, 1999). It can be applied to all fuzzy information or biometric traits that are in compliance with its requirement regarding Hamming metrics. As hamming metrics is employed, this scheme was initially applied mostly to iris instead of fingerprints represented by minutiae sets. Secure Sketch, a kind of key-generation technology, was proposed by Dodis et al. in 2004 (Yevgeniy Dodis, Leonid Reyzin, and Adam Smith. Fuzzy extractors: How to generate strong keys from biometrics and other noisy data. In Advances in Crypology-Eurocrypt, volume 3027, pages 523-540. Springer-Verlag, 2004). A Fuzzy Extractor was also proposed in this paper, trying to convert random biometric data to stable keys that can be applied in any encryption environment, so as to enable reliable and secure user identity authentication. According to the secure sketch technique, some public information is extracted from the biometrics. This operation can tolerate a certain degree of errors. Once a data similar to the template data is input, the public information can be used to perfectly reconstruct the template data. However, the public information alone is not enough for reconstruction. The Fuzzy Extractor extracts an approximately uniformly-distributed random data R from input biometric data. Then R can be applied as a key to any encryption environment. PinSketch is a typical secure sketch technology which operates in set metric spaces. Wrap-around secure sketch is another kind of secure sketch technology operating in Euclidean space. It was proposed by Golic et al. at 2008 (Golic, J. D.; Baltatu, M.; "Entropy Analysis and New Constructions of Biometric Key Generation Systems," Information Theory, IEEE Transactions on, vol. 54, no. 5, pp. 2026-2040, May 2008. doi: 10.1109/TIT.2008.920211).

A major factor determining the performance and security of a fingerprint encryption system is the selection of feature. Currently, the minutia, which is the most stable and robust feature of the fingerprint, is adopted in most systems. However, the minutia is a global feature, which needs registration during application. However, the registration in the fingerprint encryption system is still a difficult problem in that: 1) the fingerprint encryption system is aimed to protect the minutiae from leakage, so minutiae information can no longer be used for registration, and other effective features need to be found; 2) it is difficult to detect a stable feature suitable for registration in a fingerprint image, (e.g., the singular point is unstable and can only be used in registration of rigid transformation.)

SUMMARY OF THE INVENTION

In light of the foregoing, the present invention provides a secure registration-free fingerprint authentication method and system based on local features.

The secure registration-free fingerprint authentication method based on local features comprises:

extracting descriptor features and local structure features of fingerprint minutiae from an input fingerprint image;

performing quantization and feature selection with respect to the features of the fingerprint minutiae; and encrypting the selected features and then decrypting the encrypted features to obtain the fingerprint image.

The present invention adopts the local features to construct the secure fingerprint authentication system, thus avoiding complex registration in encryption domain. The present invention improves the performance and security of the system, and meanwhile lowers the risk of the system being attacked.

DETAILED DESCRIPTION OF PREFERRED EMBODIMENTS

Figure 1:
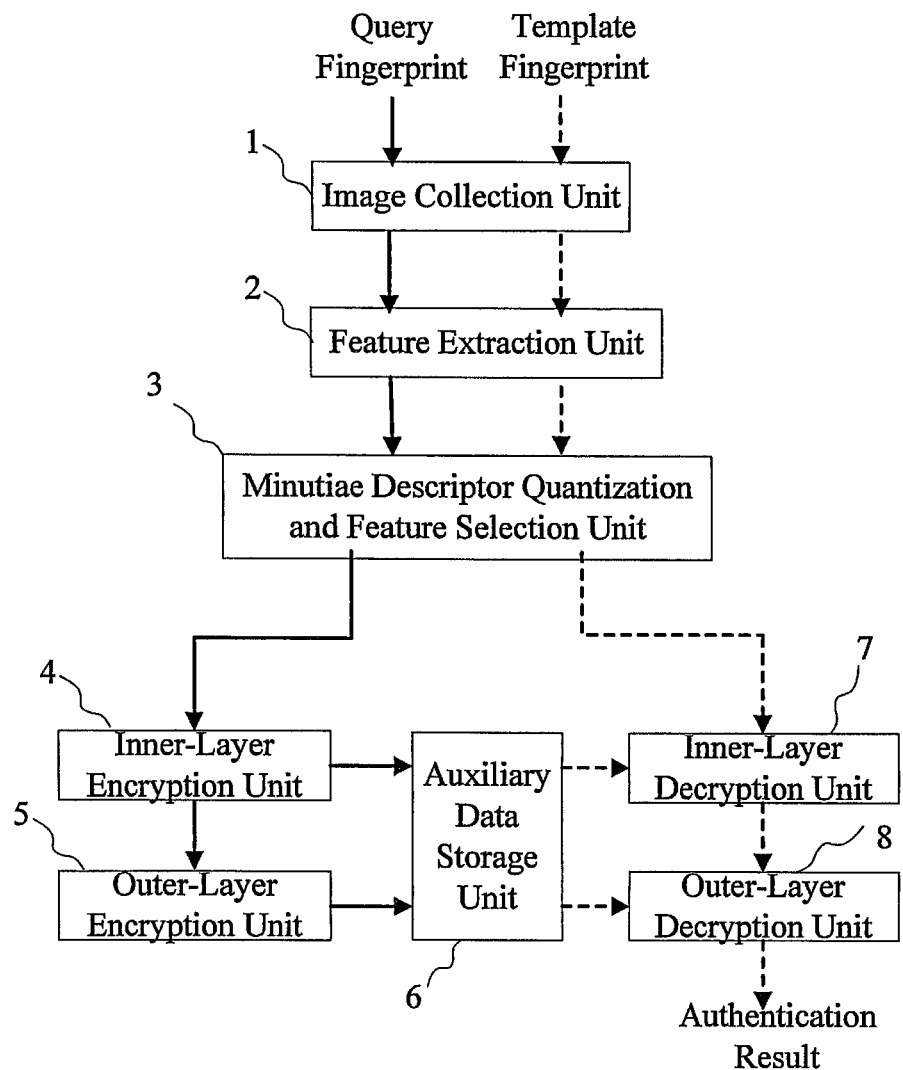
FIG. 1 illustrates an overview diagram of a registration-free fingerprint encryption system based on local features.

The present invention will be described with reference to the accompanied drawings. As shown in FIG. 1, descriptor features and minutiae local structure features of minutiae are extracted from a fingerprint image. During encryption, quantized descriptor features of the minutiae are encrypted with the fuzzy commitment scheme, and the local structure features of the minutiae are encrypted with the wrap-around secure sketch. Auxiliary data obtained by the two encryptions is then stored for decryption. The foregoing process is called inner-layer encryption. The code obtained by the encryption with the wrap-around secure sketch is then subject to outer-layer encryption with the PinSketch. Auxiliary data thus obtained is stored for decryption. During decryption, part of the auxiliary data is decrypted with the fuzzy commitment scheme, and another part of the auxiliary data is decrypted with the wrap-around secure sketch. Data obtained by the two inner-layer decryptions, together with outer-layer auxiliary data, can be used as input of PinSketch outer-layer decryption. If the outer-layer decryption successes, the code generated by the inner wrap-around encryption can be recovered.

The present invention may comprise the following operations:

(1) A fingerprint image is input and pre-processed to calculate an orientation field and detect minutiae. Descriptor features and local structure features of the minutiae are then extracted.

(2) Each missing descriptor feature value of a certain minutia is predicted by averaging the descriptor feature values of corresponding locations of 5 minutiae neighbouring minutia, so as to obtain all descriptor feature values.

(3) Quantization and feature selection are performed with respect to the minutiae. The descriptor features of the minutiae are quantized using Gray code to generate quantized descriptor feature vectors. Then relatively reliable values are selected from respective quantized descriptor feature vectors through Sequential Forward Float Selection (SFFS).

(4) Inner-layer encryption: Let $m_{Ti}$ denote an i th minutia of a template fingerprint and $m_{Ti}^q$ denote a vector obtained after the quantization and feature selection of the descriptor feature of the minutia corresponding to $m_{Ti}$. Then the fuzzy commitment scheme is carried on. An error-correction code is selected to have a same length as that of a final descriptor vector. A code word $c_i$ is selected from the code book randomly. Then XOR is conducted on the error-correction code and the code word to get $e_i = m_{Ti}^q \oplus c_i$. Meanwhile, a hash value $h(c_i)$ is calculated for $c_i$, where $h(\bullet)$ denotes a certain hash function. Let $l_{Ti}$ denote the local structure feature of the minutia corresponding to $m_{Ti}$, and secure sketch operation is performed on it using wrap-around construction, which is shown as equation (1):

$$(y_i, z_i) = SS_{wa}(l_{Ti}) \quad (1)$$

Here, $SS_{wa}(\bullet)$ denotes the secure sketch operation based on the wrap-around construction; $y_i$ denotes public auxiliary data (also called sketch data) obtained through the secure sketch operation; and $z_i$ denotes a code word generated during the secure sketch operation and to be applied for subsequent steps.

Auxiliary data $\{e_i, h(c_i), y_i\}$ generated by the above inner-layer encryption is saved as template, and the codeword $z_i$ is input to a next-layer encryption as intermediate data.

(5) Outer-layer encryption: Let $\{z_i\}_{i=1}^n$ denote all the code words generated by the above inner-layer encryption for all the minutiae. The code words are then subject to the PinSketch operation, as shown in equation (2).

$$P = SS_{ps}(\{z_i\}_{i=1}^n) \quad (2)$$

Here, $SS_{ps}(\bullet)$ denotes the secure sketch operation based on the PinSketch, and P denotes auxiliary data generated by the PinSketch operation.

(6) Store as the template all the auxiliary data, including $\{e_i, h(c_i), y_i\}_{i=1}^n$ and P, obtained through the inner-layer encryption and the outer-layer encryption.

(7) Inner-layer decryption: Let s denote a total number of minutiae in a query fingerprint image, $m_{Qj}$ denote the ith minutia, $\{m_{Qj}\}_{j=1}^s$ denote a final vector obtained after the quantization and feature selection of the respective descriptor features of all the minutiae $\{m_{Qj}^q\}_{j=1}^s$, and $\{l_{Qj}\}_{j=1}^s$ denote the respective local structure vectors of all the minutiae. First, exhaustive search is conducted for the auxiliary data $\{e_i, h(c_i)\}_{i=1}^n$, which is then decoded using the fuzzy commitment scheme as follows:

1) XOR is conducted on a descriptor vector $m_{Qj}^q$ corresponding to a jth minutia of a query fingerprint image and the auxiliary data $\{e_i, h(c_i)\}$ corresponding to the i th minutia of the fingerprint template, i.e., $c_i' = e_i \oplus m_{Qj}^q$.

2) Then error correction is conducted on $c_i'$ using error-correction code algorithm, i.e., $c_i'' = Dec(c_i')$. Here Dec ($\bullet$) denotes the error-correction algorithm selected during the encryption.

3) Hash-check is conducted, wherein if $hash(c_i'') = hash(c_i)$, the fuzzy commitment decoding successes; whereas if the hash-check fails, another decoding for the exhaustive search is conducted.

4) If the hash-check successes, the auxiliary data $y_i$ is decrypted using a corresponding local structure vector $l_{Qj}$ of the minutia of the query fingerprint by means of the wrap-around construction, i.e., $z_i' = Rec_{wa}(l_{Qj}, y_i)$, where $Rec_{wa}(\bullet, \bullet)$ denotes the decoding algorithm of the wrap-around construction. $z_i'$ denotes a codeword generated by the decoding algorithm. Let p denotes a number of the code words obtained through this process, i.e., $\{z_i'\}_{i=1}^p$.

(8) Outer-layer decryption: $\{z_i'\}_{i=1}^p$ is decoded using the auxiliary data P through a PinSketch decoding algorithm, which is shown as equation (3):

$$\{\hat{z}_i\}_{i=1}^p = Rec_{ps}(\{z_i'\}_{i=1}^p, P) \quad (3)$$

Here $Rec_{ps}(\bullet, \bullet)$ denotes the PinSketch decoding algorithm, $\{\hat{z}_i\}_{i=1}^p$ denotes the code words recovered thereby. If the decoding successes, the authentication is successful, and the code words that have been recovered can be used as keys.

The invention will be described in detail with reference to the accompanied drawings and embodiments.

FIG. 1 illustrates an overview diagram of a secure registration-free fingerprint encryption system based on local features, in which:

Image collection unit 1 is configured to collect a template fingerprint and a query fingerprint to generate a template fingerprint image and a query fingerprint image, respectively.

Figure 2:
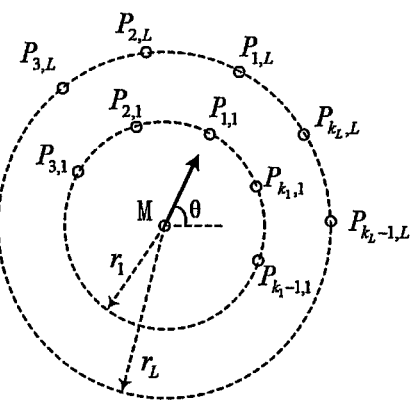
FIG. 2 illustrates a schematic diagram of a descriptor feature of a minutia.
Figure 3:
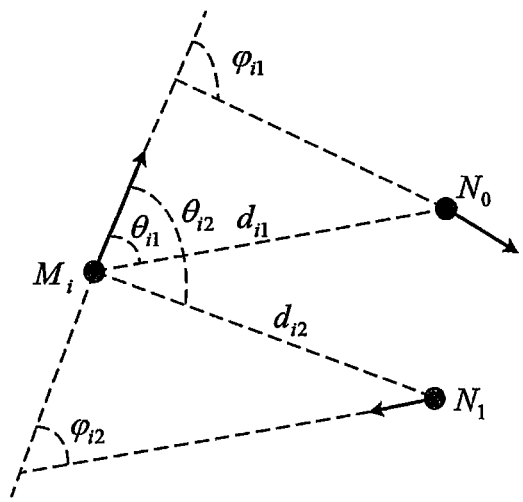
FIG. 3 illustrates a schematic diagram of a structure feature of a minutia.

Feature extraction unit 2 is configured to be connected to the image collection unit 1 and extract fingerprint features of minutiae from the template fingerprint image and the query fingerprint image. The fingerprint feature of a certain minutia comprises a descriptor feature and a local structure feature of this minutia. The descriptor feature of the certain minutia refers to a vector consisting of respective differences between orientations of 76 sampling points distributed on four concentric circles centered at this minutiae and the orientation of this certain minutiae as shown in FIG. 2. This vector is denoted by $m_{Ti} = \{\theta_{ij}\}_{j=1}^{76}$. The local structure feature of the certain minutia comprises respective relative distances and relative angles between the certain minutia and its two closest neighbouring minutiae as shown in FIG. 3. This feature is denoted by $l_{Ti} = (d_{i1}, d_{i2}, \theta_{i1}, \theta_{i2}, \phi_{i1}, \phi_{i2})$.

A minutiae descriptor quantization and feature selection unit 3 is configured to be connected to the feature extraction unit 2 and calculate missing values of the descriptor feature of the fingerprint minutiae obtained by the feature extraction unit 2. Then the minutiae descriptor quantization and feature selection unit 3 quantizes the descriptor vectors using Gray code, and then selects relatively reliable elements from the quantized vectors by means of the sequential forward float selection (SFFS) method to obtain final vectors.

An inner-layer encryption unit 4 is configured to be connected to the minutiae descriptor quantization and feature selection unit 3 and encrypt the quantized descriptor features and local structures of the minutiae with fuzzy commitment construction and wrap-around construction, respectively, to obtain auxiliary data. The auxiliary data is stored into the auxiliary data storage unit 6. Besides, the code words obtained during the inner-layer encryption of the local structure features of the minutiae are input as intermediate values to an outer-layer encryption unit.

The outer-layer encryption unit 5 is configured to be connected to the inner-layer encryption unit 4 and encrypt the code words input from the inner-layer encryption unit 4 by means of the PinSketch method to generate auxiliary data, which is input to an auxiliary data storage unit 6.

The auxiliary data storage unit 6 is configured to be connected to the inner-layer encryption unit 4 and the outer-layer encryption unit 5 and store the auxiliary data produced by the inner-layer encryption unit 4 and the outer-layer encryption unit 5.

An inner-layer decryption unit 7 is configured to be connected to the minutiae descriptor quantization and feature selection unit 3 and the auxiliary data storage unit 6. The inner layer decryption unit 7 is configured to acquire from the minutiae descriptor quantization and feature selection unit 3 the quantized descriptor vectors and the local structure vectors of the minutiae of the query fingerprint, and acquire the auxiliary data from the auxiliary data storage unit 6. Afterwards, exhaustive search is carried on, and decryption is conducted using fuzzy commitment and the wrap-around sketch, respectively. The code words obtained by the decryption are used for outer-layer decryption if the decryption successes.

An outer-layer decryption unit 8 is configured to be connected to the auxiliary data storage unit 6 and the inner-layer decryption unit 7. The outer-layer decryption unit 8 is configured to acquire code words generated by the inner-layer decryption unit 7, and acquire the auxiliary data from the auxiliary data storage unit 6. Then decryption is conducted so using the PinSketch and an authentication result is output.

Figure 4:
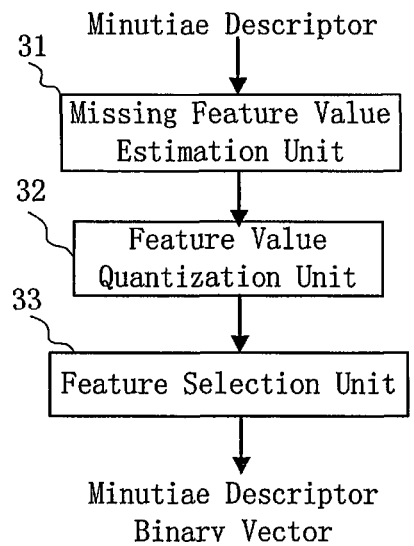
FIG. 4 illustrates a schematic diagram for quantization and selection of the descriptor features of the minutiae.

FIG. 4 illustrates a schematic diagram of the minutiae descriptor quantization and feature selection unit 3. A missing feature value estimation unit 31 is configured to be connected to the feature extraction unit 2. For a certain minutia located at the edge of the fingerprint image, its missing feature values is estimated by averaging the feature values of corresponding locations of 5 minutiae neighbouring certain minutia, so as to obtain all feature values. The feature value quantization unit 32 is configured to be connected to the missing feature value estimation unit 31 and quantize each descriptor feature value to a 5-bit binary string using the Gray code. A feature selection unit 33 is configured to be connected to the feature value quantization unit 32 and select relatively reliable values from the quantized descriptor feature vectors using the sequential forward float selection (SFFS) method.

Figure 5:
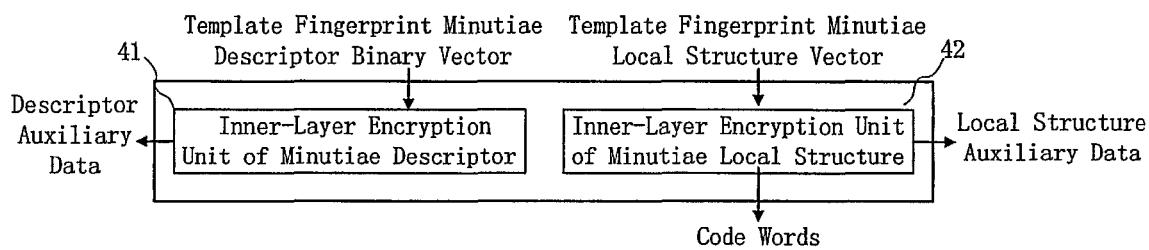
FIG. 5 illustrates an operation flow of an inner-layer encryption unit.

FIG. 5 illustrates a schematic diagram of the inner-layer encryption unit 4. Let $m_{Ti}$ denote an ith minutia of a template fingerprint and $m_T^q$ denote a final vector obtained after the quantization and feature selection of the descriptor feature of the minutia corresponding to $m_{Ti}$. Let $l_{Ti}$ denote the local structure feature of the minutia corresponding to $m_{Ti}$. A minutiae descriptor inner-layer encryption unit 41 adopting the Fuzzy Commitment construction is configured to be connected to the minutiae descriptor quantization and feature selection unit 3. An error-correction code is selected to have a same length as that of the final descriptor vector. A code word $c_i$ is selected from the code book randomly. Then XOR is conducted on the error-correction code and the code word to get $e^i = m_{Ti}^q \oplus c_i$. Meanwhile, a hash value $h(c_i)$ is calculated for $c_i$, where $h(\bullet)$ denotes a certain hash function. A minutiae local structure inner-layer encryption unit 42 is configured to be connected to the feature extraction unit 2 and perform PinSketch operation using the wrap-around construction, which is shown as equation. Here, $SS_{wa}(\bullet)$ denotes the secure sketch operation based on the wrap-around construction; $y_i$ denotes public auxiliary data (also called sketch data) obtained through the secure sketch operation; and $z_i$ denotes a code word generated during the secure sketch operation and to be applied for subsequent steps.

Auxiliary data $\{e_i, h(c_i), y_i\}$ generated by the above inner-layer encryption is saved as template, and the codeword $z_i$ is input to a next-layer encryption as intermediate data.

Figure 6:
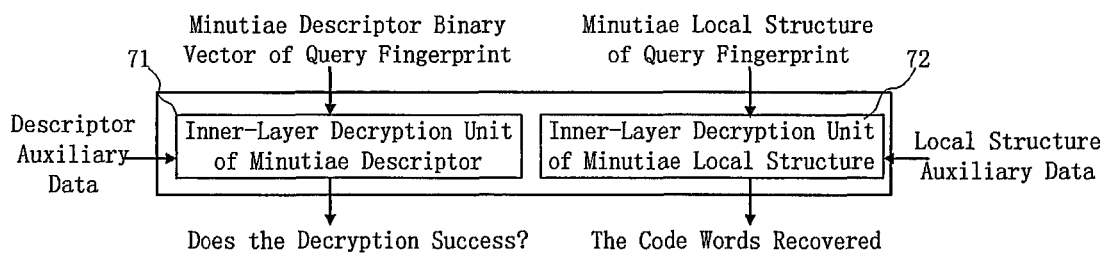
FIG. 6 illustrates an operation flow of an inner-layer decryption unit.

FIG. 6 illustrates a schematic diagram of an inner-layer decryption unit 7. Let s denote a total number of minutiae in a query fingerprint image, $m_{Qj}$ denote the ith minutia, $\{m_{Qj}\}_{j=1}^s$ denote a final vector obtained after the quantization and feature selection of the respective descriptor features of all the minutiae $\{m_{Qj}\}_{j=1}^s$, and $\{l_{Qj}\}_{j=1}^s$ and denote the respective local structure vectors of all the minutiae. A minutiae descriptor inner-layer decryption unit 71 is configured to be connected to the minutiae descriptor quantization and feature selection unit 3 and the auxiliary data storage unit 6. First, the minutiae descriptor inner-layer decryption unit 71 conducts exhaustive search on the auxiliary data $\{e_i, h(c_i)\}_{i=1}^1$, and decode the same using the fuzzy commitment scheme as follows:

1) XOR is conducted on a descriptor vector $m_{Qj}^q$ corresponding to a jth minutia of the query fingerprint image and the auxiliary data $\{e_i, h(c_i)\}$ corresponding to the ith minutia of the fingerprint template, i.e., $c_i' = e_i \oplus m_{Qj}^q$.
2) Then error correction is conducted on $c_i'$ using error-correction code algorithm, i.e., $c_i'' = Dec(c_i')$. Here $Dec(\bullet)$ denotes the error-correction algorithm selected during the encryption.
3) Hash-check is conducted, wherein if $hash(c_i'') = hash(c_i)$, the fuzzy commitment decoding successes; whereas if the hash-check fails, another decoding for the exhaustive search is conducted.

A minutiae local structure inner-layer decryption unit 72 is configured to be connected to the minutiae descriptor quantization and feature selection unit 3 and the auxiliary data storage unit 6. If the hash-check by the minutiae descriptor inner-layer decryption unit 71 successes, the minutiae local structure inner-layer decryption unit 72 decrypts the auxiliary data $y_i$ using a corresponding local structure vector $l_{Qj}$ of the minutia of the query fingerprint by means of the wrap-around construction, i.e., $z_i' = Rec_{wa}(l_{Qj}, y_i)$, where $Rec_{wa}(\bullet, \bullet)$ denotes the decoding algorithm of the wrap-around construction. $z_i'$ denotes a code word generated by the decoding algorithm. Let p denotes a number of the code words obtained through this process, i.e., $\{z_i'\}_{i=1}^p$.

According to an embodiment, the foregoing solution can be applied to a secure fingerprint authentication system. The system conforms to the specifications of object-oriented programming methods and software engineering and is realized by C++ language on Windows XP SP2+Visual Studio 2005 platform. All the experiments are conducted on a personal computer with an Intel Core2 1.86G CPU.

The FVC2002 DB2 database, which is used in the second international fingerprint recognition competition, is selected for the experiment. This database includes 100×8=800 fingerprints. The first two fingerprint images of each finer are selected for test. In genuine test, the first image of each finger is taken as a template fingerprint, and the second image of the same finger is used as a query fingerprint. As a result, totally 100 "genuine" results are produced. Imposter test takes the first image of each finger as the template fingerprint, and the first fingerprint image of the other fingers are taken as the query fingerprint, totally 4950 "imposter" results are produced. The FAR (False Accept Rate) and the GAR (Genuine Accept Rate) are calculated to evaluate the performance of the system. The best result achieved in this embodiment is GAR of 92% at zero FAR.

In light of the foregoing, the secure fingerprint authentication system and method proposed in the present invention provide a solution to the security problems existing in conventional fingerprint authentication systems, and the user's fingerprint template information can be well protected. In addition, the authentication performance satisfies the requirement of practical applications.

The description above only intends to provide an explanation of the embodiments of the present invention rather than limit the scope thereof. Those skilled in the art can make various changes or substitutions within disclosure of the present invention. These changes and substitutions all fall within the scope of the invention. Therefore, the scope of the present invention shall be defined by the attached claims.

The invention claimed is:

1. A secure registration-free fingerprint authentication method based on local structures, comprising:
   extracting descriptor features and local structure features of fingerprint minutiae from an input fingerprint image;
   conducting quantization and feature selection with respect to the features of the fingerprint minutiae;
   encrypting the selected features and then decrypting the encrypted features to obtain the fingerprint image;
   wherein the encrypting comprises inner-layer encryption and outer-layer encryption;
   wherein the inner-layer encryption comprises:
   selecting an error-correction code having a same length as that of a final descriptor vector;
   selecting a code word $c_i$ from a code book randomly;
   conducting XOR on the error-correction code and the code word to get $e_i = m^q_{Ti} \oplus c_i$;
   calculating a hash value $h(c_i)$ for the code word $c_i$, where $h(\cdot)$ denotes a certain hash function:
   conducting PinSketch operation on $l_{Ti}$, which denotes the local structure feature of the minutia corresponding to $m_{Ti}$ by:

$$(y_i, z_i) = SS_{wa}(l_{Ti})$$

where $SS_{wa}(\cdot)$ denotes the PinSketch operation based on wrap-around construction; $y_i$ denotes public auxiliary data, which is also called sketch data, obtained through the PinSketch operation; and $z_i$ denotes a code word generated during the PinSketch operation and to be used for subsequent steps; and
   wherein each of the above steps is performed by a computing device.

2. The method according to claim 1, wherein a missing descriptor feature value of a certain minutia is estimated by averaging the feature values of corresponding locations of five minutia neighbouring the certain minutia, so as to obtain all missing feature values.

3. The method according to claim 1, wherein Gray code is used for the quantization of the fingerprint minutiae.

4. The method according to claim 3, wherein reliable values are selected from quantized descriptor feature vectors of the minutiae using sequential forward float selection (SFFS) method.

5. The method according to claim 1, wherein the outer-layer encryption comprises:
   encrypting the code words generated during the inner-layer encryption using the PinSketch and obtaining outer-layer auxiliary data.

6. The method according to claim 1, wherein the decrypting comprises inner-layer decryption and outer-layer decryption.

7. The method according to claim 6, wherein the inner-layer decryption comprises:
   conducting XOR on a descriptor vector $m_{Qj}^q$ corresponding to a jth minutia of a query fingerprint image and auxiliary data $\{e_i, h(c_i)\}$ corresponding to an ith minutia of a fingerprint template, i.e., $c_i' = e_i \oplus m_{Qj}^q$;
   conducting error correction on $c_i'$ using error-correction code algorithm, i.e., $c_i'' = Dec(c_i')$, where $Dec(\cdot)$ denotes the error-correction algorithm selected during the encryption;
   conducting hash-check, wherein if $hash(c_i'') = hash(c_i)$, fuzzy commitment decoding successes; whereas if the hash-check fails, another decoding for exhaustive search is conducted; and
   decrypting the auxiliary data $y_i$ using a corresponding local structure vector $l_{Qj}$ of the minutia of the query fingerprint by means of wrap-around construction, i.e., $z_i' = Rec_{wa}(l_{Qj}, y_i)$, where $Rec_{wa}(\cdot, \cdot)$ denotes the decoding algorithm of the wrap-around construction $z_i'$ denotes a code word generated by the decoding algorithm, and a number p of the code words are obtained through this process, i.e., $\{z_i'\}_{i=1}^{p}$.

8. The method according to claim 6, wherein the outer-layer decryption comprises:
   decoding the code words generated during the inner-layer decryption using PinSketch decoding algorithm.

9. A secure registration-free fingerprint authentication system based on local structures, comprising:
   a non-transitory computer readable medium wherein the computer readable medium comprises:
   a feature extraction unit configured to extract descriptor features and local structure features of fingerprint minutiae from an input fingerprint image;
   a quantization and feature selection unit configured to conduct quantization and feature selection with respect to the features of the fingerprint minutiae;
   an encryption and decryption unit configured to encrypt the selected features and then decrypt the encrypted features to obtain the fingerprint image:,
   wherein the encryption unit comprises an inner-layer encryption unit and an outer-layer encryption unit;
   wherein the inner-layer encryption unit is configured to:
   select an error-correction code having a same length as that of a final descriptor vector;
   select a code word $c_i$ from a code book randomly;
   conduct XOR on the error-correction code and the code word to get $e_i = m_{Ti}^q \oplus c_i$;
   calculate a hash value $h(c_i)$ for the code word $c_i$, where $h(\cdot)$ denotes a certain hash function; and
   conduct PinSketch operation on $l_{Ti}$, which denotes the local structure feature of the minutia corresponding to $m_{Ti}$ by:

$$(y_i, z_i) = SS_{wa}(l_{Ti})$$

where $SS_{wa}(\cdot)$ denotes the PinSketch operation based on wrap-around construction; $y_i$ denotes public auxiliary data, which is also called sketch data, obtained through the PinSketch operation; and $z_i$ denotes a code word generated during the PinSketch operation and to be used for subsequent steps.

10. The system according to claim 9, wherein the quantization and feature selection unit further comprises a missing feature value estimation unit configured to estimating a missing descriptor feature value of a certain minutia by averaging the feature values of corresponding locations of five minutia neighbouring the certain minutia, so as to obtain all missing feature values.

11. The system according to claim 9, wherein Gray code is used for the quantization of the fingerprint minutiae.

12. The system according to claim 11, wherein reliable values are selected from quantized descriptor feature vectors of the minutiae using sequential forward float selection (SFFS) method.

13. The system according to claim 9, wherein the outer-layer encryption unit is configured to:
encrypt the code words generated during the inner-layer encryption using the PinSketch and obtain outer-layer auxiliary data.

14. The system according to claim 9, wherein the decryption unit comprises an inner-layer decryption unit and an outer-layer decryption unit.

15. The system according to claim 14, wherein the inner-layer decryption unit is configured to:
conduct XOR on a descriptor vector $m_{Qj}^q$ corresponding to a jth minutia of a query fingerprint image and auxiliary data $\{e_i, h(c_i)\}$ corresponding to an ith minutia of a fingerprint template, i.e., $c_i'=e_i \oplus m_{Qj}^q$;

conduct error correction on $c_i'$ using error-correction code algorithm, i.e., $c_i''=\text{Dec}(c_i')$, where $\text{Dec}(\bullet)$ denotes the error-correction algorithm selected during the encryption;

conduct hash-check, wherein if $\text{hash}(c_i'')=\text{hash}(c_i)$, fuzzy commitment decoding successes; whereas if the hash-check fails, another decoding for exhaustive search is conducted; and decrypt the auxiliary data $y_i$ using a corresponding local structure vector $l_{Qj}$ of the minutia of the query fingerprint by means of wrap-around construction, i.e., $z_i'=\text{Rec}_{wa}(l_{Qj}, y_i)$, where $\text{Rec}_{wa}(\bullet,\bullet)$ denotes the decoding algorithm of the wrap-around construction $z_i'$ denotes a code word generated by the decoding algorithm, and a number p of the code words are obtained through this process, i.e., $\{z_i'\}_{i=1}^{p}$.

16. The system according to claim 14, wherein the outer-layer decryption comprises:
decoding the code words generated during the inner-layer decryption using PinSketch decoding algorithm.

* * * * *